United States Patent
Fuhrmann et al.

(10) Patent No.: US 8,423,835 B2
(45) Date of Patent: Apr. 16, 2013

(54) SYSTEM AND METHOD PROVIDING FAULT DETECTION CAPABILITY

(75) Inventors: Peter Fuhrmann, Aachen (DE); Markus Baumeister, Munich (DE); Manfred Zinke, Aachen (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 12/673,175

(22) PCT Filed: Aug. 7, 2008

(86) PCT No.: PCT/IB2008/053175
§ 371 (c)(1),
(2), (4) Date: Apr. 11, 2011

(87) PCT Pub. No.: WO2009/022272
PCT Pub. Date: Feb. 19, 2009

(65) Prior Publication Data
US 2011/0191659 A1    Aug. 4, 2011

(30) Foreign Application Priority Data
Aug. 16, 2007    (EP) .................................... 07114447

(51) Int. Cl.
*G06F 11/00* (2006.01)
(52) U.S. Cl.
USPC ......................................................... 714/57
(58) Field of Classification Search .................. 714/807, 714/799, 57
See application file for complete search history.

(56) References Cited

U.S. PATENT DOCUMENTS

| | | | |
|---|---|---|---|
| 5,701,316 A * | 12/1997 | Alferness et al. | 714/807 |
| 2003/0145120 A1 | 7/2003 | Vasko et al. | |
| 2003/0229423 A1* | 12/2003 | Andarawis et al. | 700/286 |
| 2006/0212506 A1* | 9/2006 | Vasyltsov | 708/620 |

(Continued)

FOREIGN PATENT DOCUMENTS

| | | |
|---|---|---|
| EP | 1069733 A2 | 1/2001 |
| EP | 1496435 A1 | 12/2005 |
| WO | 01/45317 A2 | 6/2001 |

OTHER PUBLICATIONS

"Overlay" title lookup in online dictionary http://thesaurus.com/browse/overlay?s=t, retrieved on Nov. 20, 2012.*

(Continued)

*Primary Examiner* — Scott Baderman
*Assistant Examiner* — Yair Leibovich (57) ABSTRACT

A system and method for providing fault detection capability is provided which comprises a first node (2). The first node (2) comprises a first processing subsystem (5) generating data (14) to be transmitted. The first node (2) has a fault supervisor unit (13) adapted to gather and process fault indications arising in the first node (2). The first processing subsystem (5) and the fault supervisor unit are both integrated in the first node (2). The first node (2) is structured such that, when no fault indications are detected by the fault supervisor unit (13), the fault supervisor unit (13) provides a first key (15) as a validity key, and, when at least one fault indication is detected by the fault supervisor unit (13), the fault supervisor unit (13) provides a second key (16) as the validity key, and the data (14) to be transmitted are encrypted by overlaying the respective validity key (15; 16) on the data.

20 Claims, 4 Drawing Sheets

U.S. PATENT DOCUMENTS

2006/0256367 A1   11/2006  Wei
2007/0189536 A1*   8/2007  Gammel et al. ............ 380/259
2008/0040628 A1*   2/2008  Mandal .............................. 714/4
2009/0313476 A1*  12/2009  Liu et al. ...................... 713/182

OTHER PUBLICATIONS

"Overlay" title lookup in online dictionary http://www.merriam-webster.com/dictionary/overlay, retrieved on Nov. 20, 2012.*

Mariani, R., et al; "Cost-Effective Approach to Error Detection for an Embedded Automotive Platform"; SAE Technical Paper Series; Society of Automotive Engineers, Warrendale, PA, US; No. 2006-01-0837; Apr. 1, 2006; Cover, pp. 35-46.

International Search Report for Int'l Patent Appln. No. PCT/IB2008/053175 (Mar. 4, 2009).

Terry L. Fruehling, Delphi Secured Microcontroller Architecture, SAE Technical Paper Series, 2000.

R. Piggin, Safety Networking, www.isa.org, May 2004.

M. Mack, CANopen safety chip simplifies safety-related development, www.embedded.com, Jul. 2005.

* cited by examiner

SYSTEM AND METHOD PROVIDING FAULT DETECTION CAPABILITY

FIELD OF THE INVENTION

The present invention relates to a system and method providing fault detection capability, more specifically, it relates to a system and method with fault detection capability in which data to be transmitted are overlaid with a validity key providing information on the validity of the data.

BACKGROUND OF THE INVENTION

In recent years in-vehicle networks (IVN) have found their way into cars and are used for transmitting control data for a variety of distributed applications. Prominent and recent examples of such communication networks in the field of automotive are LIN (local interconnected network), CAN (controller area network) and FlexRay. These networks are also used in safety-relevant applications in the area of vehicle dynamics control such as for example assisted front steering (AFS) or electronic stability program (ESP), in passive safety systems such as for example air bags, and in engine management systems. For those applications, in a distributed system setup, safety related data have to be transmitted via the communication network.

Control systems used in such applications are often designed in such a way that, in a first node, sensor information provided by a sensor connected to the first node is gathered and possibly pre-processed and then transmitted to at least one other node, i.e. to a second node. The second node uses the transmitted information to control an actuator connected to the second node. The first and second nodes usually comprise microcontroller units (MCU).

With respect to the transmission of safety related data in such a system, particular measures have to be taken in order to cope with the occurrence of transmission errors such as data repetition, loss of data, insertion of data, sequence failures, delays in transmission as well as kinds of masquerade and data corruption. As an example for such measures, safety procedures are used which run on top of the transmission protocol as a safety layer and which allow the receiving node, i.e. the second node, to detect that a transmission error has occurred. After the detection of a transmission error, the second node can then take proper actions, e.g. enter a safe system state.

As an example of such a safety procedure, the data to be transmitted are often protected with an application checksum before transmission from the first node to the second node, the application checksum allowing the second node to detect whether the data have been altered during transmission due to the occurrence of a transmission error. Commonly, a CRC (cyclic redundancy check) is used for the checksum which is appended to the data to be transmitted, thus enabling reliable detection of transmission errors.

Additionally to transmission errors during transmission of data from the first node to the second node, faults can occur in the processing subsystem of the first node which processing subsystem is responsible for execution of all software tasks required to be performed in the first node.

Various concepts have been proposed in order to address detection and handling of faults which affect the processing subsystem of a node. These concepts include complex dual microcontroller solutions, asymmetric microcontroller architectures as well as integrated dual-core, lock-step concepts.

Running a full-redundant microcontroller as an independent unit is quite expensive since another microcontroller with the same performance as the main controller is needed.

An asymmetric solution with plausibility checks suffers from the lack in comprehensiveness with respect to fault coverage. Some errors cannot be detected so that the trustworthiness is in question. Further, such approach requires a number of interconnections between the separate microcontrollers in order to realize the complex and often application-dependent information exchange. The introduced delay for error detection might exceed the allowable limits for certain applications. Thus, the asymmetric approach is not suitable for all kinds of applications.

The publication "Cost-effective Approach to Error Detection for an Embedded Automotive Platform" by R. Mariani et al. in SAE TECHNICAL PAPER SERIES 2006-01-0837 discloses the realization of fast and accurate fault detection by an independent checker and monitor architecture. According to this architecture, integrated fault detectors are provided to subunits of a node and the error indications of these integrated fault detectors are gathered and processed by a main fault supervisor unit which is also integrated on the same chip. This architecture eliminates the need for a second microcontroller to do redundant operations and processing tasks at application level.

In particular in use in safety-relevant applications, the operation of the second node must depend on correct operation of the first node and information about faults occurring in the processing subsystem of the first node has to be forwarded to the second node in order to prevent unintended or incorrect operation of the second node.

It is generally known to transmit information about faults in the processing subsystem of the first node via an extra line or an additional communication system. However, such a solution is expensive and not feasible for applications in the automotive domain. Further, it is known to transmit such information in separate pieces, e.g. to transmit data and associated validity information one after another. In this case, data and validity information are only loosely coupled in time which might violate requirements regarding fault detection latency time, which is not acceptable in safety-relevant applications. As a consequence, it has to be ensured that data and validity information are transmitted as one single entity.

Furthermore, it has to be ensured that the data and the validity information are not both affected by common failures based on the same cause which might lead to false data erroneously declared to be valid.

OBJECT AND SUMMARY OF THE INVENTION

Thus, it is the object of the present invention to provide a system and a method providing fault detection capability in which information about an error which has occurred at a first node transmitting data can be provided in a reliable way with minimum processing resources.

This object is solved by the system according to claim 1.

The system comprises a first node with a first processing subsystem generating data to be transmitted. The first node has a fault supervisor unit adapted to gather and process fault indications arising in the first node. The first processing subsystem and the fault supervisor unit are both integrated in the first node. When no fault indications are detected by the fault supervisor unit, the fault supervisor unit provides a first key as a validity key. When at least one fault indication is detected by the fault supervisor unit, the fault supervisor unit provides a second key as the validity key. The data to be transmitted are encrypted by overlaying the respective validity key on the data.

In this context, overlaying the validity key on the data means that the data to be transmitted itself, a part of the data, or a checksum forming a part of the data to be transmitted is modified by applying the validity key. This means, the validity key is not provided separate from the data or only appended to the data. Encrypting the data in this context means modifying the data or the checksum such that it contains modified information.

By providing the first node with the fault supervisor unit which is integrated with the first processing subsystem, faults occurring in the first node are reliably detected with an integrated unit without the necessity to provide a complicated and cost-intensive structure. Since the fault supervisor unit provides different keys indicating whether an error has been detected in the first node or not, the validity information concerning the data to be transmitted can be provided together with the data to be transmitted. By overlaying the validity key on the data to be transmitted, the validity information concerning errors at the first node can be combined with the data such that no separate measures have to be taken in order to transmit the validity information. Overlaying the validity information on the data has the advantage that data and validity information form one single entity and no extra band width is necessary for transmission. Further, the system realizes the features with minimum processing resources.

According to an aspect, the first node is connected to a sensor and the data to be transmitted is related to a signal provided by the sensor. Since the first node is connected to a sensor, information provided by the sensor—which information has to be processed by the first node and transmitted thereafter—can be explicitly validated or invalidated by means of the validity information. Thus, information relating to errors detected during processing of the sensor signal can be combined with the transmitted data in a reliable way.

According to another aspect, the system further comprises a second node provided with at least the first key which is structured to receive the transmitted data and extract the validity information. With this arrangement, a second node receiving the data from the first node can reliably detect the validity or invalidity of the data.

If the second node is connected to an actuator which is controlled in response to the transmitted data, the second node can properly react in case that the data have been invalidated at the first node, e.g. the actuator can be reliably driven into a safe state. Thus, the performance of the system in safety-relevant applications in which an actuator is driven by data generated at the first node is enhanced and the reliability of operation of the actuator is enhanced.

If the second node comprises a second processing subsystem, the transmitted data can be further analyzed in the second node and further information about validity of the transmitted data can be extracted. Further, in this case the second node can perform various operations in order to further process the transmitted data for subsequent processes.

Preferably, the second node is provided with or coupled to a safe state control unit which is structured to drive the actuator in a safe system state if the data transmitted to the second node are invalid. This safe state control unit may be integrated in the second node or may be located outside the second node. According to this realization, the actuator can reliably be driven in a safe system state in case that an error has occurred in the first node or in case that a transmission error has occurred. Thus, malfunction of the actuator due to invalid data can be prevented from occurring. In this context, a safe system state is understood as a state of the actuator which has been predetermined for the case that a fatal error occurs in the system. In other words, the safe system state is a state in which the actuator shall be driven in case of an error that would otherwise lead to a system hazard.

If the data are provided with a checksum enabling detection of transmission errors and the validity key is overlaid on the checksum, both, information about errors occurring at the first node and information about transmission errors can be transmitted as a single entity together with the actual data without requiring an enlarged band width. Thus, in case of an error, information on the type of error which has actually occurred can be extracted from the transmitted data.

According to a still further aspect, the data are transmitted from the first node to the second node via a bus system. Thus, data transmission in the bus system can be realized in a safe way and information about errors occurring in the nodes connected to the bus system can be reliably transmitted together with the data via the bus. If the bus system is an in-vehicle network for a car, safety-relevant information for various systems connected to the network can be reliably transmitted and the system fulfills the requirements with regard to fault tolerance, cost efficiency and reliability as required in applications in a car.

According to a further aspect, the first node comprises several subunits provided with integrated fault detectors and the fault supervisor unit processes fault indications received from these integrated fault detectors. Thus, the first node is provided with an independent supervisor and checker architecture which reliably allows detection of errors occurring in the respective subunits. Further, in this structure the data are explicitly validated or invalidated by an independent unit, namely the fault supervisor unit, which processes error information with regard to all subunits of the first node. Thus, the data can be validated or invalidated without complicated or expensive additional structures or processing resources.

Preferably, not only the first key used for keeping the transmitted data valid is present in the second node but also the second key used for invalidating the data. In this case, by using both keys for examining the transmitted data it can be determined in the second node whether the data have been intentionally invalidated or a transmission error has occurred.

Preferably, the fault supervisor unit is provided with a checksum calculation unit, the actual data to be transmitted is provided to the fault supervisor unit, and the fault supervisor unit performs the checksum calculation. In this case, providing of the first key or the second key by the fault supervisor unit is realized in that the checksum calculation is performed in different ways depending on the respective first or second key, e.g. by choosing different CRC polynomial generators or initialization vectors.

The object is solved by a method providing a fault detection capability in a dependable system, comprising the steps of: generating data to be transmitted; receiving fault indication from the system; wherein, when no fault indications are received, using a first key as a validity key for encrypting the data to be transmitted, and, when at least one fault indication is received, using a second key as the validity key for encrypting the data, and encrypting the data to be transmitted by overlaying the respective validity key on the data.

BRIEF DESCRIPTION OF THE DRAWINGS

Further features and advantages of the present invention will arise from the detailed description of embodiments with reference to the enclosed drawings.

DESCRIPTION OF EMBODIMENTS

Figure 1:
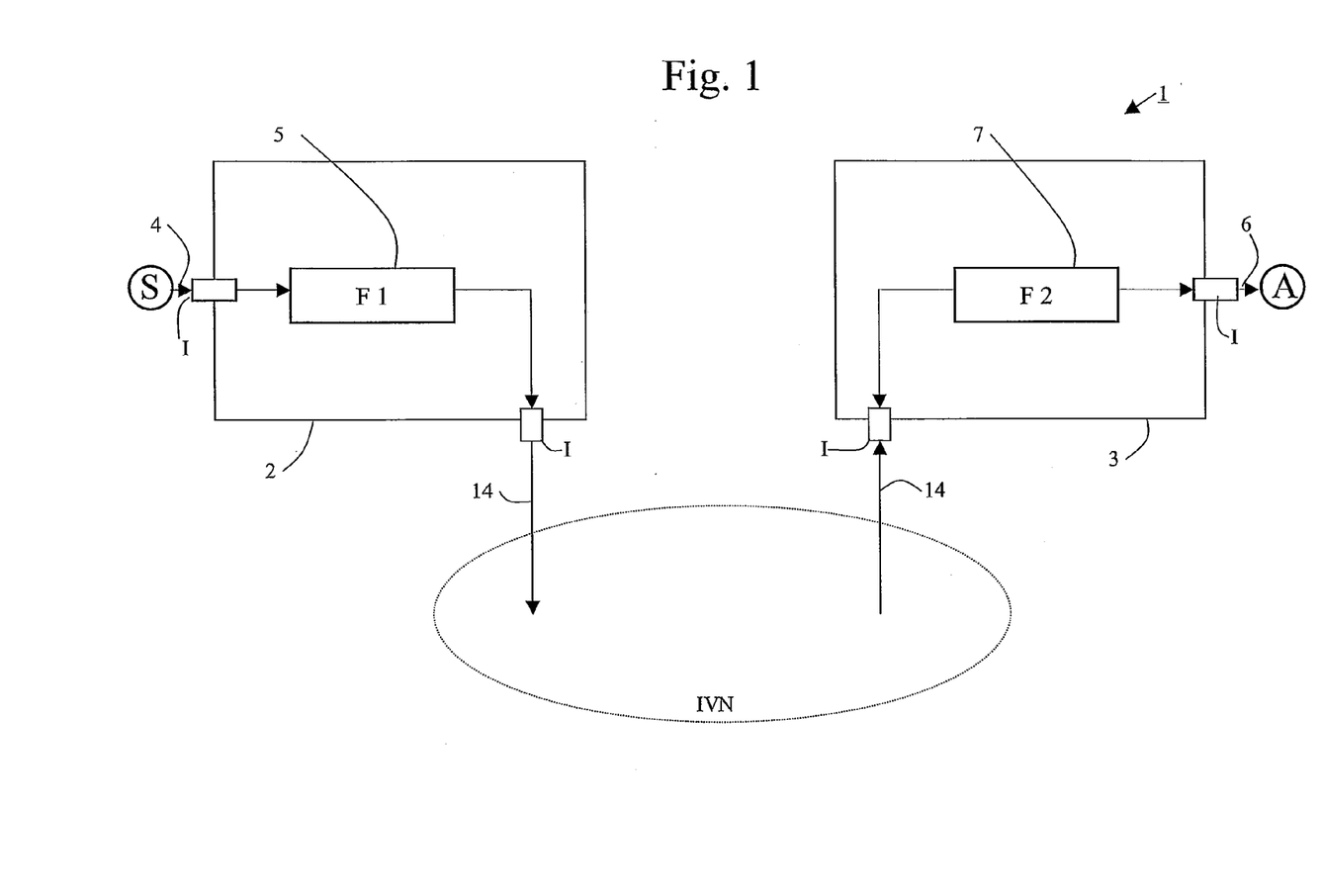
FIG. 1 schematically shows the basic structure of a system according to a first embodiment of the present invention.

A first embodiment of the present invention will be described with reference to FIGS. 1 to 5. As can be seen in FIG. 1, the system 1 according to the embodiment comprises a first node 2 and a second node 3. The first node 2 is connected to a sensor S via a connection line 4. The first node 2 comprises a processing subsystem 5 which is structured to gather and process information received from the sensor S via the connection line 4. The second node 3 is connected to an actuator A via a further connection line 6. Further, the second node 3 comprises a further processing subsystem 7 which is structured to control the operation of the actuator A. In the present embodiment, the first node 2 and the second node 3 are both formed by microcontroller units. The first node 2 and the second node 3 are interconnected via a network IVN which allows in particular transmission of data from the first node 2 to the second node 3. But, also the inverse transmission direction or transmissions to not illustrated nodes are possible. As schematically indicated in FIG. 1, the first node 2 and the second node 3 are provided with interfaces I for transmission of signals from the sensor S to the processing subsystem 5 of the first node 2, from the processing subsystem 7 of the second node 3 to the actuator A, from the processing subsystem 5 of the first node 2 to the network IVN, and from the network IVN to the processing subsystem 7 of the second node 3. The interfaces I for transmission from the sensor S to the processing subsystem 5 and from the processing subsystem 7 to the actuator A may be provided by AD converters and DA converters or other suitable peripheral interfaces, for example. In order to allow transmission of data via the network IVN, the first node 2 and the second node 3 are provided with appropriate bus interfaces and bus driver (not shown), wherein the exact structure is not relevant for the present embodiment and therefore will not be described in detail. In particular, the first node 2 and the second node 3 may be connected by a communication network such as LIN, CAN or FlexRay and appropriate network devices therefore may be provided. In a particular embodiment, the communication network is an in-vehicle network adapted for use in a car.

In principle, the system 1 is adapted such that the first node 2 gathers and processes information received from the sensor S, as schematically indicated by F1, and transmits data 14 related to the received information via the network IVN to the second node 3. Usually digital data are transmitted. The second node 3 receives the transmitted data 14 and controls the actuator A based on the data, as schematically indicated by F2.

Figure 2:
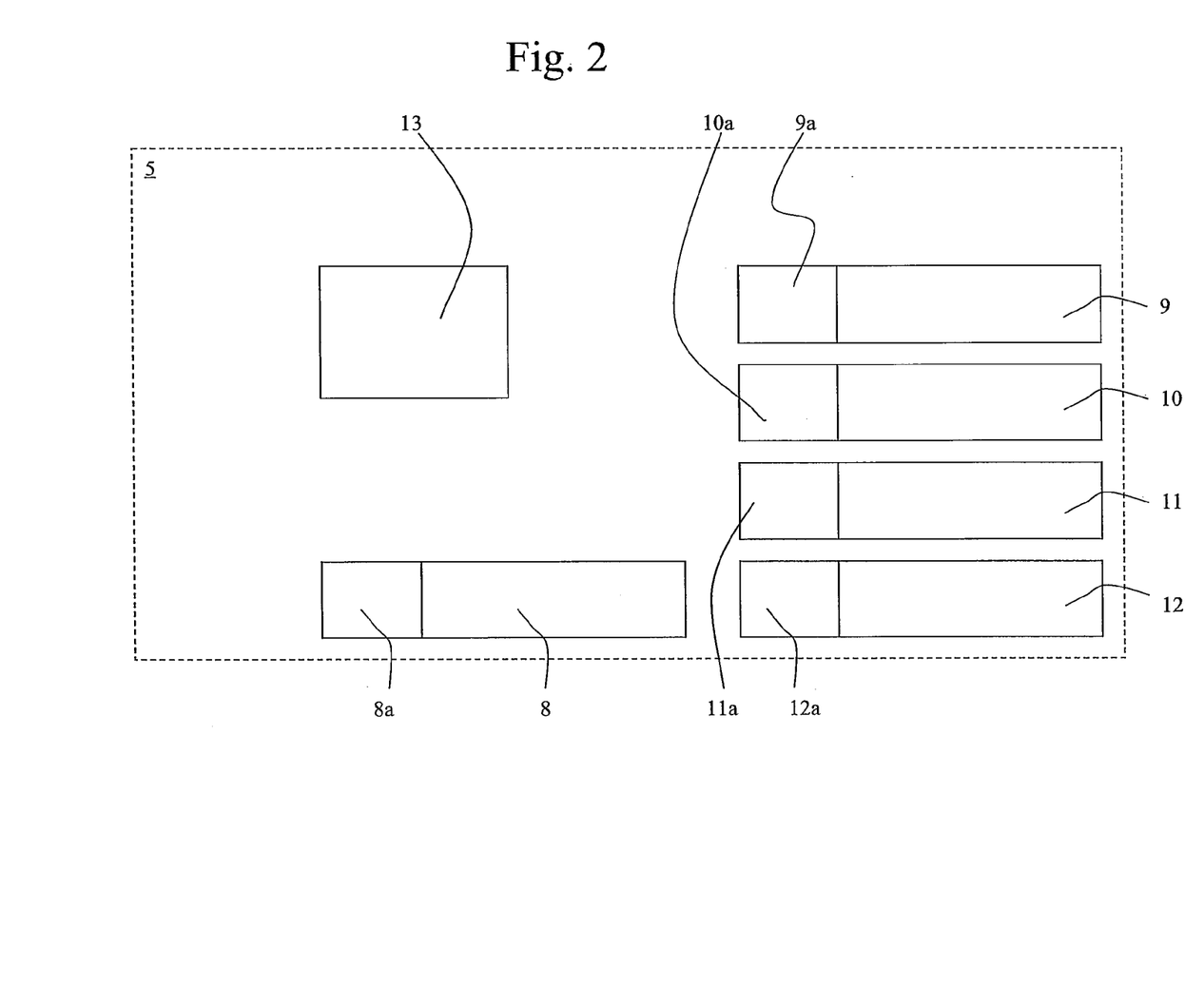
FIG. 2 schematically shows the basic structure of the processing subsystem of the first node of FIG. 1.

The first node 2 is formed by a microcontroller unit (MCU) comprising the processing subsystem 5. The structure of the processing subsystem 5 will now be described in more detail with respect to FIG. 2. The processing subsystem 5 basically comprises a central processing unit (CPU), memories, a bus infrastructure such as e.g. AHB or AXI, and further infrastructure elements needed for software execution such as e.g. interrupt controllers etc. Similarly, the processing subsystem 7 of the second node 3 comprises a CPU, memories, a bus infrastructure, and further infrastructure elements needed for software execution. Due to the similar structure and corresponding operation the processing subsystem 7 of the second node 3 will not be described in detail. In FIG. 2, the subunits of the processing subsystem 5 of the first node 2 are designated by reference signs 8, 9, 10, 11, and 12 of which reference sign 8 designates the CPU, for example.

As can be seen in FIG. 2, the subunits 8-12 of the processing subsystem 5 are provided with corresponding integrated fault detectors 8a, 9a, 10a, 11a, 12a which are capable of determining whether a fault has occurred in one of the associated subunit 8, 9, 10, 11, or 12. In FIG. 2 all subunits 8-12 are shown to be provided with integrated fault detectors 8a-12a. However, alternatively only those subunits in which faults are likely to occur can be provided with such integrated fault detectors 8a-12a. The basic structure of such an integrated fault detector which can be used in the present embodiment can be realized as disclosed in the prior art discussed in the introduction. In summary, the integrated fault detectors are structured to detect and flag faults affecting the processing subsystem 5 as well as faults occurring at peripherals of the first node 2. The occurrence of a fault in one of the subunits 8-12 is indicated by the corresponding integrated fault detector 8a, 9a, 10a, 11a, or 12a by issuing a fault indication.

Further, the processing subsystem 5 comprises a fault supervisor unit 13 connected to the respective integrated fault detectors 8a-12a. The fault supervisor unit 13 receives and processes the fault indications issued by the integrated fault detectors 8a-12a. The fault supervisor unit 13 and the processing subsystem 5 are both integrated in the first node 2, which in the present embodiment is formed by a microcontroller unit. The fault supervisor unit processes the fault indications in order to detect whether any faults have occurred in the processing subsystem 5 or at peripherals of the first node 2.

Figure 3:
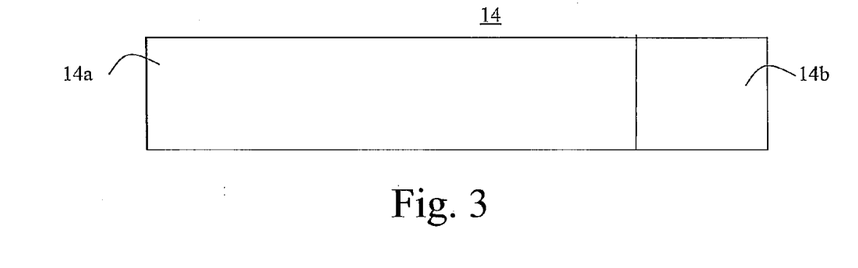
FIG. 3 schematically shows the structure of data transmitted in the system of the first embodiment of the present invention.

FIG. 3 schematically shows the structure of the data transmitted from the first node 2 to the second node 3 via the network IVN. As can be seen in FIG. 3, the transmitted data 14 include the actual data 14a containing information to be transmitted to the second node 3 and an application checksum 14b which is transmitted together with the actual data 14a in order to allow the detection of transmission errors. For example CRCs (cyclic redundancy checks) are used for the application checksum 14b.

First, the procedure of using the application checksum will be described in general. According to the present embodiment, this general procedure is modified as will be described thereafter. The processing subsystem 5 of the first node 2 provides the actual data 14a to be transmitted and determines the application checksum 14b in order to generate the data 14 to be transmitted to the second node 3. The processing subsystem 7 of the second node 3 receives the transmitted data 14 and, based on the application checksum 14b transmitted together with the actual data 14a, determines whether communication/transmission errors have occurred. Thus, by use of the application checksum 14b, communication errors can reliably be detected and the second node 3 can enter a safe system state when a communication error is detected to have occurred.

Figure 4:
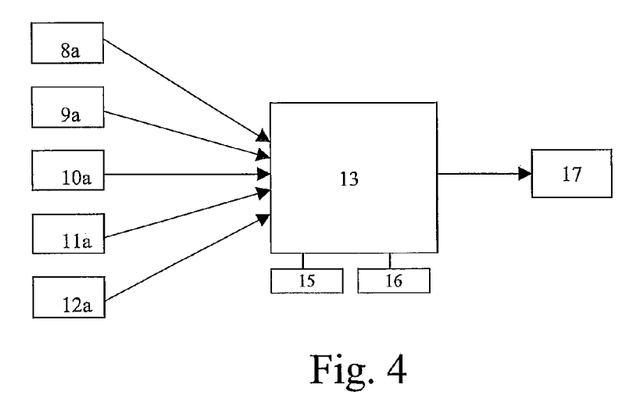
FIG. 4 schematically shows an operation performed in the first node according to the present invention.

The operation of the fault supervisor unit 13 in the first embodiment will now be described. As is schematically shown in FIG. 4, the fault supervisor unit 13 receives the fault indications from one of the respective integrated fault detectors 8a, 9a, 10a, 11a, and 12a. If the fault supervisor unit 13 detects that no fault has occurred in the first node 2, the fault supervisor unit 13 selects a first key 15. In contrast, if the fault supervisor unit 13 detects that one or more faults have occurred, the fault supervisor unit 13 selects a second key 16. The fault supervisor unit 13 outputs the selected key 15 or 16 to the application software 17 which is executed on the processing subsystem 5. The application software 17 is configured such that the first or second key 15 or 16, respectively, output by the fault supervisor unit 13 is overlaid on the data 14 to be transmitted as validity information. The first key 15 is configured such that, when the first key 15 is overlaid on the data 14 to be transmitted, the application checksum 14b is kept valid. In contrast, the second key 16 is configured such that, when the second key 16 is overlaid on the data 14 to be transmitted, the application checksum 14b is invalidated.

For example, the procedure of providing the first key 15 or the second key 16 to the application software 17 can be realized by providing different initialization vectors for a CRC checksum calculation used to arrive at the data portion 14a. The first key 15 and the second key 16 can be realized to represent different generator polynomials to be used for the checksum calculation.

After transmission to the second node 3, the processing subsystem 7 of the second node 3 checks the validity of the transmitted data 14 using the first key 15 and the application checksum procedure (as described above). If the first key 15 has been overlaid on the data in the first node 2 and no transmission error has occurred, the processing subsystem 7 comes to the result that the transmitted actual data 14a are valid. However, if the second key 16 has been overlaid on the data 14 to be transmitted, a detectable mismatch is caused when the processing subsystem 7 of the second node 3 checks the data validity by using the first key 15 and the application checksum procedure.

Thus, the second node 3 can reliably detect if a fault has occurred in the first node 2 or during transmission. Since the validity information is overlaid on the data 14 to be transmitted, no extra band width is needed for transmission from the first node 2 to the second node 3. However, in this embodiment, as the second node 3 only uses the first key 15 and the application checksum procedure, the second node 3 cannot differentiate between a transmission error and an error which has occurred in the first node 2.

A more detailed description of the realization according to the first embodiment will now be given with respect to FIG. 5.

Figure 5:
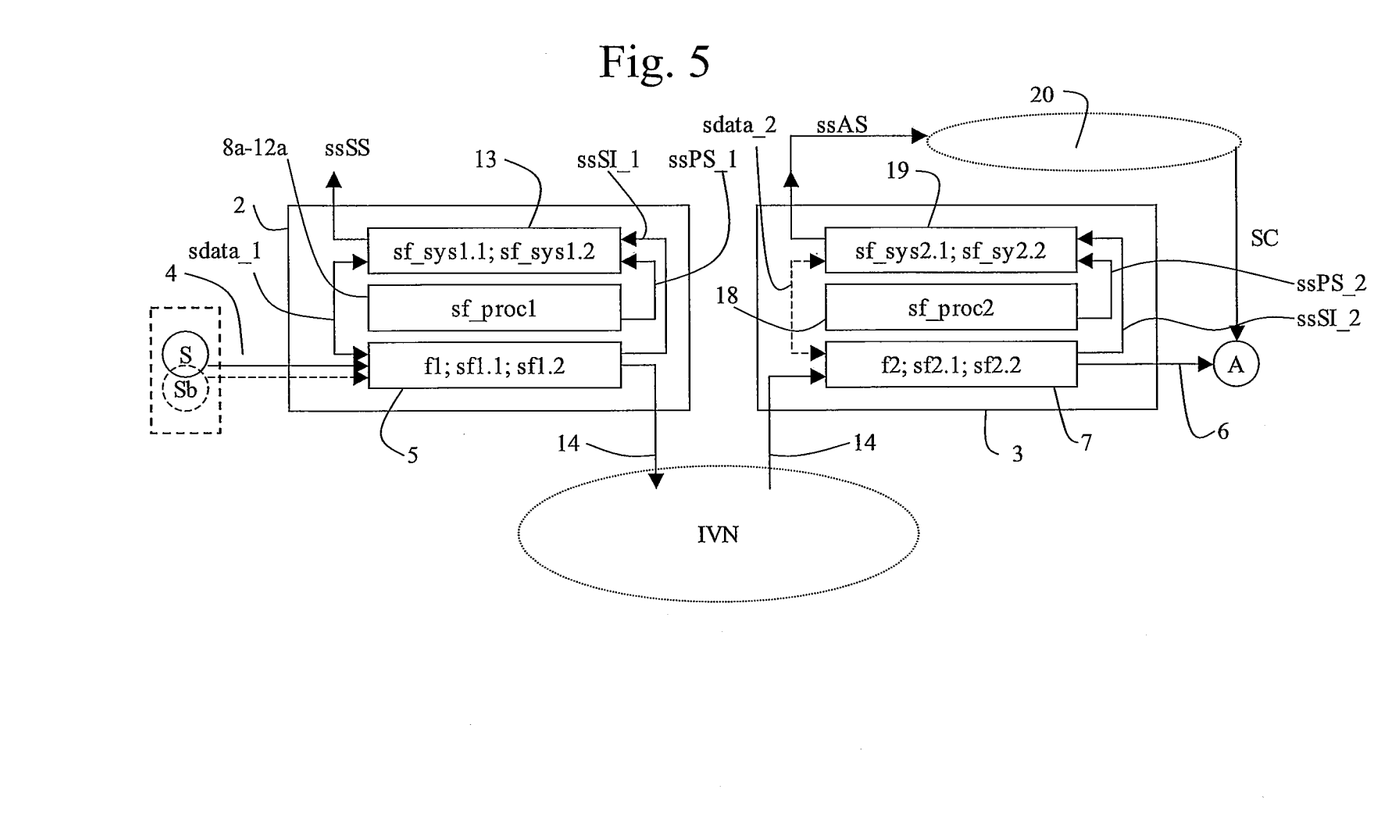
FIG. 5 schematically shows in more detail the construction of a system according to the first embodiment of the present invention.

In FIG. 5 software functions running on the processing subsystem 5 of the first node 2 and software functions running on the processing subsystem 7 of the second node 3 are schematically indicated. Furthermore, functions allocated to the fault detectors 8a-12a of first node 2 and 18 of second node 3 and the fault supervisor 13 of first node 2 and 19 of second node 3 are schematically indicated.

With respect to the first node 2, f1 represents an application function which gathers and preprocesses the sensor input received from sensor S via the connection line 4 and which prepares the data 14 for transmission to the second node 3.

sf1.1 represents a safety function which is responsible for providing the correct sensor information to f1. Further, sf1.1 represents all other safety functions needed to implement the required safety protocol layer for communication via the network IVN.

In the embodiment shown, a second sensor Sb is provided which provides second sensor information redundant to that provided by sensor S to the first node 2. The software function sf1.1 running on the processing subsystem 5 of the first node 2 is realized to examine the sensor inputs from sensors S and Sb. sf1.1 checks whether both values from S and Sb are equal, deviate from each other, or values are missing. If no correct sensor value can be determined, this is signaled via a safety signal ssSI_1 to the fault supervisor unit 13. The sensor information could also be provided and assessed in a triple modular redundancy (TMR) scheme in which case sf1.1 serves as a voter. As a further alternative, the provision of the second redundant sensor Sb might be omitted if the corresponding loss in reliability can be accepted.

With respect to the second node 3, 12 represents a function to control the actuator A dependent on the transmitted data 14. sf2.1 represents a safety function responsible to unpack the safety protocol layer introduced to protect the data for transmission via the network IVN.

sf_proc1 represent the integrated fault detectors 8a-12a for the processing subsystem 5 and sf_proc2 represents an integrated fault detector 18 for the processing subsystem 7, respectively. They are implemented to signal a fault affecting the corresponding processing subsystem 5 or 7 via a safety signal ssPS_1 or ssPS_2, respectively. These safety signals ssPS_1 or ssPS_2 are provided to the corresponding fault supervisor units 13, 19 which are schematically indicated by the topmost box in the processing subsystem 5 and in the processing subsystem 7, respectively.

The fault supervisor unit 13 of the processing subsystem 5 receives and examines the safety signals ssPS_1 and ssSI_1 and is implemented to react in response to these signals. This function is indicated by the safety function sf_sys1.1. The fault supervisor unit 19 of the processing subsystem 7 of the second node 3 receives and examines the safety signals ssPS_2 and ssSI_2 and is implemented to react in response to these signals. This function is indicated by the safety function sf_sys2.1. As is indicated in FIG. 5, the safety functions sf_sys1.1 and sf_sys2.1 may be implemented to provide a result of the examination to the outside of the corresponding first node 2 or second node 3 by the signals ssSS and ssAS. As can be seen in FIG. 5, in the present embodiment the signal ssAS output by the fault supervisor unit 19 of the second node 3 is provided to a safe state control unit 20. The safe state control unit 20 is adapted to drive the actuator A in a safe system state by a shutdown control signal SC, if the signal ssAS indicates that the fault supervisor unit 19 of the second node 3 has detected that a fault has occurred. Alternatively, the safe state control unit 20 can be omitted and the ssAS signal could be used directly to initiate the safe state of the actuator A. The need for the safe state control unit 20 depends e.g. on the physical signal characteristics for the actuator control, i.e. whether the signal characteristics of the signal ssAS are suitable for directly controlling the actuator A or not.

Further, the software function sf1.2 running on the processing subsystem 5 of the first node 2 and the software function sf_sys1.2 implemented within the fault supervisor unit 13 realize the validation functionality in the first node 2 the principle of which has been described above.

The software function sf2.2 running at the processing subsystem 7 of the second node 3 realizes the detection whether the transmitted data 14 are valid or not.

According to the first embodiment during the processing of f1, i.e. gathering and preprocessing of the sensor input, and of sf1.1, the safety function sf_proc1 representing the integrated fault detectors 8a-12a monitors the correct execution and signals errors via the signal ssPS_1. Depending on the signal ssPS_1, the software function sf_sys1.2 implemented within the fault supervisor unit 13 selects either the first key 15, in case of no fault being signaled, or the second key 16, in case of one or more faults being signaled. The selected key 15 or 16 is then provided to sf1.2 via the signal sdata_1. The software function sf1.2 then calculates the application checksum 14b and, depending on the signal sdata_1, overlays the first key 15 or the second key 16 on the data 14. In this embodiment, the first key 15 or second key 16 is overlaid on the application checksum 14b only.

In the second node 3, sf2.2 examines the received data 14 by applying the first key 15 and the application checksum procedure. In case that the transmitted data 14 have been invalidated by using the second key 16 at the first node 2, the mismatch will be detected in the second node 3 and the data 14a will be judged to be invalid. Also in case that a transmission error between the first node 2 and the second node 3 has occurred, the mismatch will be detected in the second node 3 and the data 14a will be judged to be invalid. Thus, the fault supervisor unit 19 of the second node 3 will issue a signal ssAS initiating the safe state control unit 20 to drive the actuator A in a safe system state.

It should be noted that the provision of the validation key 15 or 16 to the application software running on the processing subsystem 5 can be on request by the CPU. Alternatively, the provision can be triggered by the fault supervisor unit 13. This can be realized by the fault supervisor unit 13 assessing the CPU access to dedicated memory locations or a certain interrupt occurrence in order to independently derive the situation to trigger the data validity encryption. Use of the validity keys such as a read access by the CPU can be monitored by the fault supervisor unit 13 as well.

According to this embodiment the validity key 15 or 16 indicating whether faults have occurred in the processing subsystem 5 or not is overlaid to the application checksum 14b used to protect the actual data 14a for transmission. As a consequence, no additional band width is needed to transmit the validity information. Further, the validity information is transmitted as one single entity together with the actual data. With the structure described above, transmission errors as well as errors occurring on the first node 2 can be reliably detected at the second node 3.

Modifications of the First Embodiment

According to a modification, the implementation of the functionality of the first node 2 is modified. The actual data 14a to be transmitted are provided to the fault supervisor unit 13 and the function sf_sys1.2 implemented within the fault supervisor unit 13 performs the checksum calculation and provides the checksum 14b which is to be appended to the actual data 14a to be transmitted. In this modification, the fault supervisor unit 13 is provided with a checksum calculation unit which may be implemented as a CRC unit.

Second Embodiment

The system according to the second embodiment substantially corresponds to that of the first embodiment and only the differences will be described. According to the second embodiment, not only the first key 15 used for keeping the transmitted data 14 valid is present in the second node 3 but also the second key 16 which is used for invalidating the data 14. In this case, the functions implemented in the second node 3 are adapted such that, if using the first key 15 and it is judged that the data 14 are invalid, the data 14 are further examined using the second key 16. Depending on the result of the second examination, it can then be determined in the second node 3 whether the data 14 have been intentionally invalidated by the first node 2 by applying the second key 16 or a transmission error has occurred. Thus, the system according to this embodiment allows more specific identification of the cause due to which the transmitted data are invalid.

Third Embodiment

The system according to a third embodiment only differs in details from the system of the first embodiment and only the differences will be described. According to the third embodiment, functions in the second node 3 are provided similar to the first node 2. In particular, the validation key is provided by using the same procedure as for providing the validation key in the first node, i.e. by means of the identical operations. A safety function sf_sys2.2 is implemented within the fault supervisor unit 19 of the second node 3 which exchanges information with the software function sf2.2 running at the processing subsystem 7 of the second node 3 via a signal sdata_2 indicated as optional by a broken line in FIG. 5. In this modification the safety function sf_sys2.2 provides the first key 15 which is to be used for examining the received data 14. The validation key is provided in the second node 3 by the fault supervisor unit 19 of the second node 3 to the application software running on the processing subsystem 7. In this way it can be ruled out that the examination of the data 14 in the second node 3, due to a software error, erroneously uses a wrong validation key which would lead to erroneous identifying the data to be invalid. Thus, the reliability of the system can be further enhanced.

Fourth Embodiment

Again, only the differences to the preceding embodiments will be described. According to the fourth embodiment, the actual data 14a to be transmitted are provided to the fault supervisor unit 13 of the first node 2. As the provision of the first key 15 and the second key 16, the function sf_sys1.2 implements simple reversible logic functions, such as for example an XOR function, which are applied to the actual data 14a. Then, the modified data are provided back to sf1.2 running at the processing subsystem 5 of the first node 2. In this case, the respective simple reversible logic function represents the validation key. Thus two different reversible logic functions are provided as the first key 15 and the second key 16.

In the second node 3, the respective reverse function of the simple reversible logic function used for validating the data is applied to the transmitted data. In doing so, again the data can be explicitly validated or invalidated at the first node 2 and, at the second node 3, it can be determined whether the data is valid or not.

Since the simple reversible logic functions are easy to implement, this embodiment can be realized with minimum processing resources and in a very cost-efficient way. Further, these simple reversible logic functions can be executed in a time-saving manner.

Further Alternatives

The present invention is not necessarily limited to systems in which information is transmitted from a first node to a second node via a network. It can also be applied to systems in which the sensor S and the actuator A are connected to the same node which forms a control unit for both. Also in this case, the sensor data based on which the actuator A is to be controlled are explicitly validated or invalidated by an independent unit. The actuator A can then be controlled to a safe system state if the control unit detects that the data have been invalidated. Alternatively, another kind of error treatment could be applied when it is detected that the data have been explicitly invalidated.

Further, the present invention is not limited to only two nodes. The system may comprise a plurality of interconnected nodes. In particular the validity information can be transmitted to and analyzed by a plurality of nodes.

Although only a first key 15 and a second key 16 are described above for validating and invalidating the data 14 to be transmitted, a more detailed system using more than two keys could be applied. In this case, if a fault has occurred in the first node 2, the fault supervisor unit 13, depending on the type of fault which has occurred, may select one of a plurality of keys which is to be overlaid on the data to be transmitted as validity information. As a result, specific information about the type of fault which has occurred can be overlaid on the data and thus transmitted together with the data. As a consequence, the processing subsystem controlling the actuator can decide which procedures have to be performed depending on the specific validity information.

Although a scheme is described above that provides the first key 15 in the fault free condition and the second key 16 in case of any fault reported by one of the fault detector units, other decision strategies for key provision could be implemented by the fault supervisor as well. If the criticality of faults reported by the fault detectors is known at the fault supervisor 13 of the first node 2 in terms of impact to system safety comprising the second node 3 and the actuator 6, in the presence of uncritical faults indicated by the fault supervisor, the first key 15 could be provided. Only in the case of critical faults, the second key 16 is provided, i.e. the corresponding data 14 are marked invalid for the second node 3. The classification of faults and the mapping rules to the corresponding validity keys could be realized either predefined by hardware or software configurable.

The invention claimed is:

1. A system with fault detection capability comprising:
 a first node, the first node comprising a first processing subsystem generating data to be transmitted;
 the first node having a fault supervisor unit adapted to gather and process fault indications arising in the first node; the first processing subsystem and the fault supervisor unit both being integrated in the first node;
 wherein the first node is structured such that, when no fault indications are detected by the fault supervisor unit, the fault supervisor unit provides a first key as a validity key, and, when at least one fault indication is detected by the fault supervisor unit, the fault supervisor unit provides a second key as the validity key, and the data to be transmitted are modified by encrypting the data using the respective validity key on the data.

2. A system with fault detection capability according to claim 1, wherein:
 the first node includes an analog to digital converter connected to at least one sensor and configured and arranged to transmit signals communicate a signal provided by the sensor to the first processing subsystem;
 the first process subsystem is configured and arranged to generate the data to be transmitted from the signal provided by the sensor; and
 the first processing subsystem includes at least one fault detector, configured and arranged to provide one of the process fault indications to the fault supervisor unit in response to determining that a fault has occurred in the first processing subsystem.

3. A system with fault detection capability according to claim 1, wherein the system further comprises a second node provided with at least the first key, the second node being structured to receive the transmitted data and to extract validity information from the transmitted data by applying the first key.

4. A system with fault detection capability according to claim 3, wherein the second node is connected to at least one actuator which is controlled in response to the transmitted data.

5. A system with fault detection capability according to claim 4, wherein the second node is provided with a safe state control unit which is structured to drive the actuator in a safe system state, if the data transmitted to the second node are invalid.

6. A system with fault detection capability according to claim 3, wherein the second node comprises a second processing subsystem.

7. A system with fault detection capability according to claim 3, wherein the data are transmitted from the first node to the second node via a bus system.

8. A system with fault detection capability according to claim 3, wherein the first key and the second key are both present at the second node.

9. A system with fault detection capability according to claim 3, wherein:
 the second node is configured and arranged to, after applying the first key, calculate a checksum of the data to determine which one of the first and second keys was used to encrypt the transmitted data received by the second node.

10. A system with fault detection capability according to claim 9, wherein the second node comprises a second processing subsystem.

11. A system with fault detection capability according to claim 1, wherein the data are provided with a checksum enabling detection of transmission errors and the validity key is overlaid on the checksum.

12. A system with fault detection capability according to claim 11, wherein the system further comprises a second node provided with at least the first key, the second node being configured and arranged to receive the encrypted data and to extract validity information from the encrypted data by applying the first key.

13. A system with fault detection capability according to claim 12, wherein the data are transmitted from the first node to the second node via a bus system.

14. A system with fault detection capability according to claim 12, wherein the second node is connected to at least one actuator which is controlled in response to the transmitted data.

15. A system with fault detection capability according to claim 11, wherein the first node is connected to at least one sensor and the data to be transmitted are related to a signal provided by the sensor.

16. A system with fault detection capability according to claim 1, wherein the first node comprises a plurality of subunits provided with corresponding integrated fault detectors and the fault supervisor unit processes fault indications received from said integrated fault detectors.

17. A method for fault detection capability, comprising the steps of:
 at a first node, generating data to be transmitted;
 receiving a fault indication at a fault supervisor unit of the first node;
 wherein, when no fault indication is received, providing a first key from the fault supervisor as a validity key for encrypting the data to be transmitted, and, when at least one fault indication is received, providing a second key from the fault supervisor as the validity key for encrypting the data, modifying the data by encrypting the data using the respective validity key on the data and transmitting the encrypted data from the first node to a second node.

18. The method of claim 17, further comprising:

applying the first key, at the second node, to the encrypted data to determine which one of the first and second keys was used to encrypt the encrypted data.

19. The method of claim 18, further comprising:

calculating a checksum of the data to be transmitted and appending the checksum to the data to be transmitted, the overlaying of the respective validity key on the data including overlaying the respective validity key on the checksum.

20. A method for fault detection capability, comprising the steps of:

at a transmitter node, calculating a checksum of data to be transmitted;

using a fault supervisor unit, determining whether or not a fault has occurred;

in response to determining no fault has occurred, modifying the data to be transmitted by encrypting the data using a first validity key on the data;

in response to determining a fault has occurred, modifying the data to be transmitted by encrypting the data using a second validity key on the data; and transmitting the encrypted data and the checksum to a receiver; and at the receiver, determining if the encrypted data includes errors by decrypting the encrypted data using the first validity key and examining the checksum; and in response to determining that the encrypted data includes errors, determining if the errors occurred at the transmitter by decrypting the encrypted data using the second validity key and examining the checksum.

* * * * *